Patented Aug. 16, 1927.

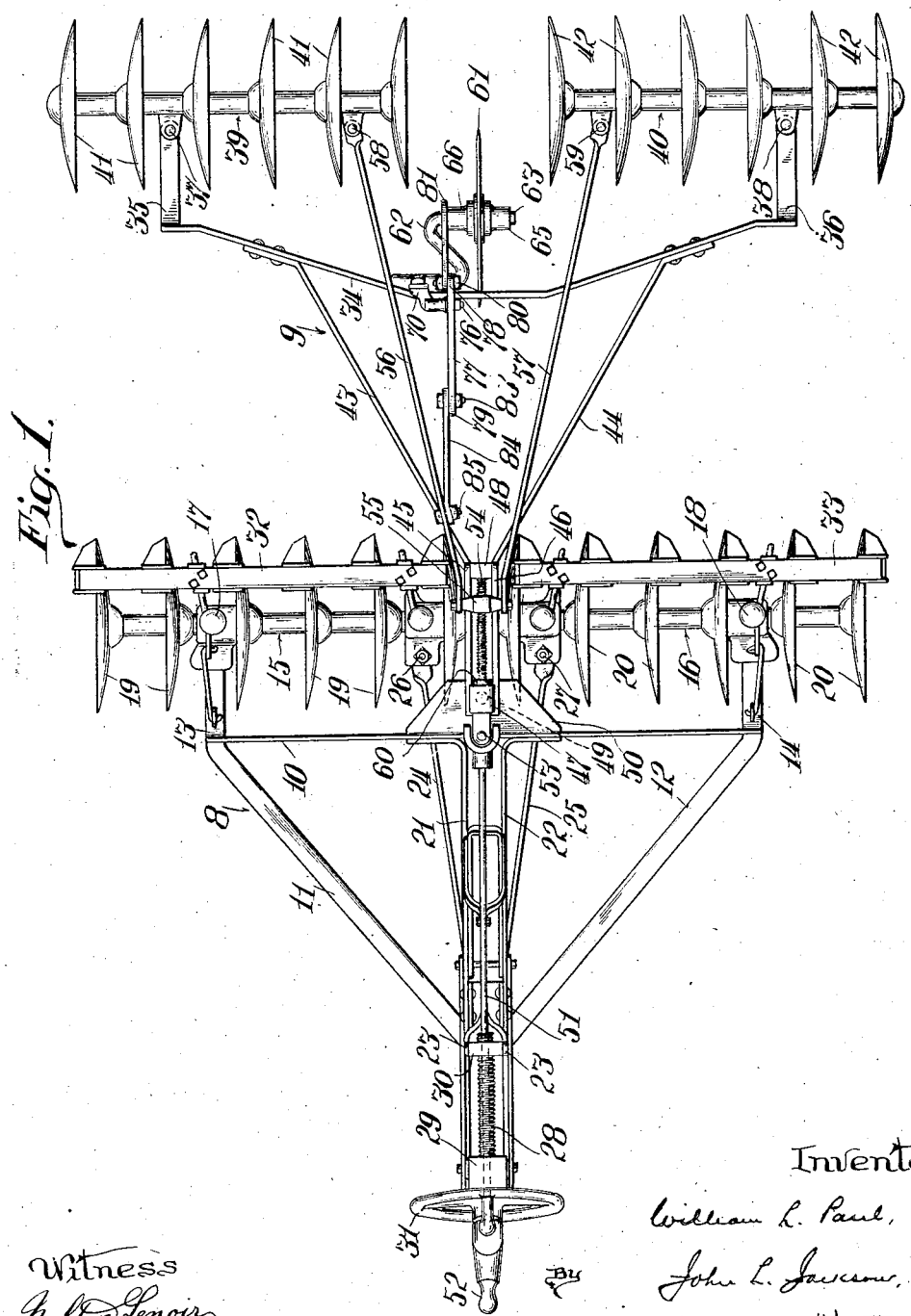

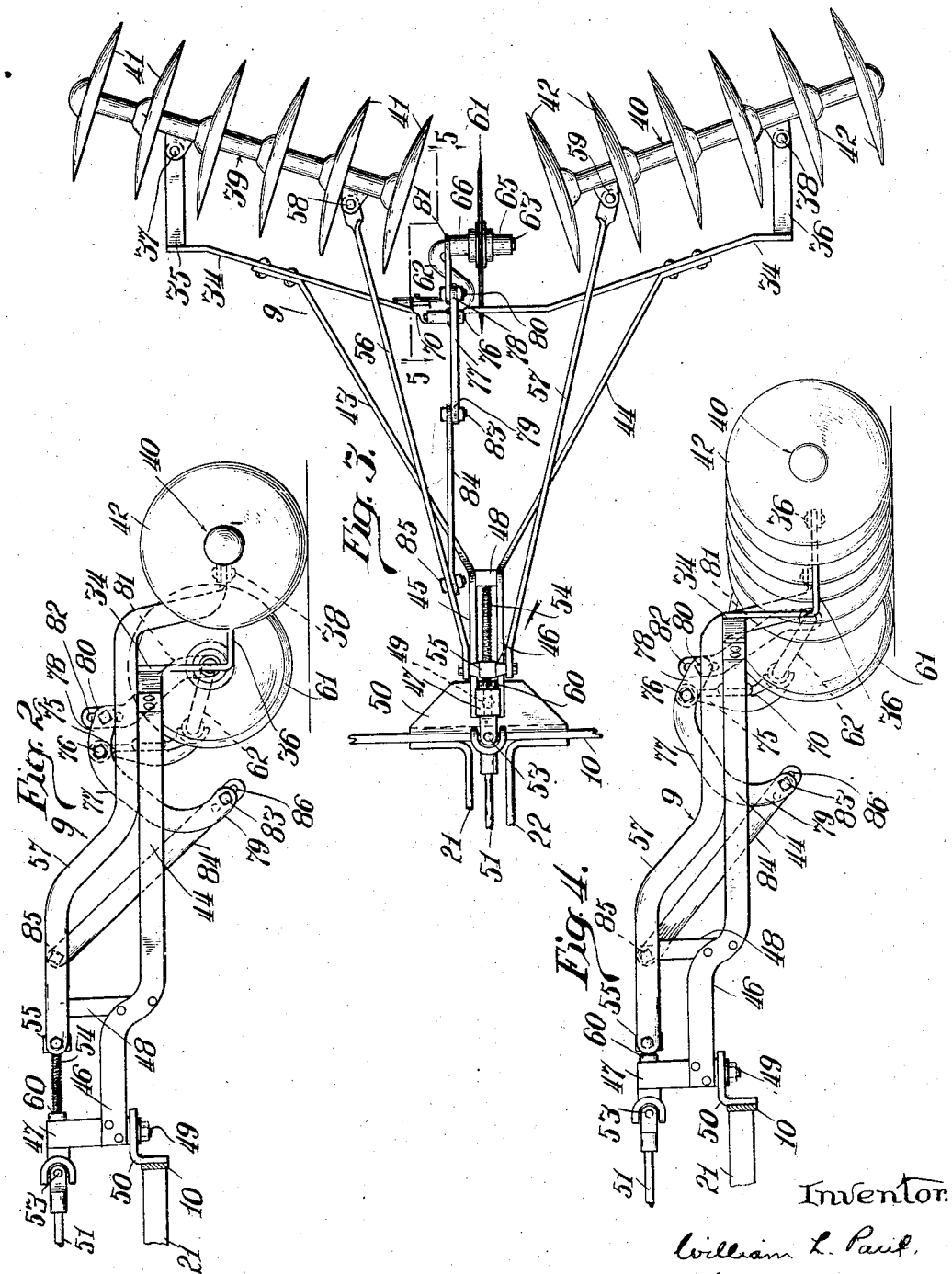

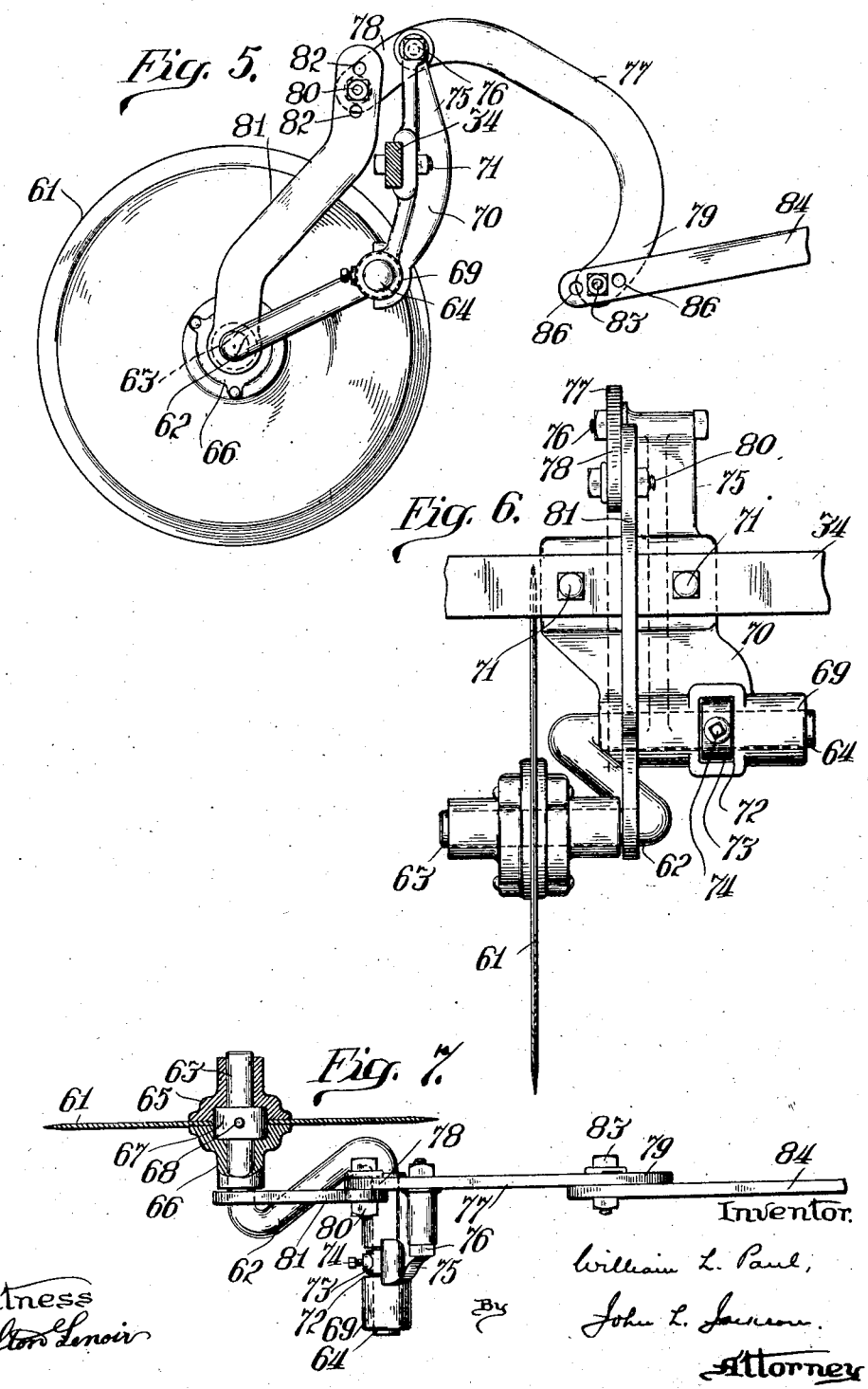

1,639,104

UNITED STATES PATENT OFFICE.

WILLIAM L. PAUL, OF BERKELEY, CALIFORNIA, ASSIGNOR TO DEERE & COMPANY, OF MOLINE, ILLINOIS, A CORPORATION OF ILLINOIS.

DISK HARROW.

Application filed November 6, 1926. Serial No. 146,585.

My invention relates to disk harrows and has to do particularly with what are commonly known as tandem disk harrows, comprising front and rear frames pivotally connected together for lateral swinging relatively to each other, each of said frames carrying two gangs of disks, the gangs of each pair being angularly adjustable with respect to the line of draft. The disks are usually concavo-convex, and the disks of one gang are set oppositely to those of the other gang carried by the same frame. Also the disks of the rear gangs are set oppositely to those of the corresponding front gangs, the front disks being arranged to throw the soil outwardly while the rear disks are arranged to throw it inwardly, thus leaving the soil in a level condition after the passage of the implement thereover.

In a rather firm soil, especially in a soddy condition, the front disks tend to cut definite furrows, and while the disks of the rear section or unit may be set to normally run in a line between the forward disks, so as to split the ridges that may be left between such furrows, which is the proper operating position, the least little variation may cause the rear disks to drop in the furrows made by the front ones and tend to remain in that position. This in a measure defeats the purpose of the disks of the rear gangs, which should break out any soil that the disks of the front section may have left undisturbed. Because of varying conditions of the soil encountered by the harrow, such as harder spots in some places than at others, or uneven surfaces, one side of the harrow, for a moment, may handle more or heavier soil than the other, thus causing a greater thrust from that side with a tendency to cause sluing of the entire section, and while normally the disks of one gang, being opposed to those of the other gang of the same section, balance such side thrust, where the load becomes uneven the balance is disturbed. This is also true on hillside work.

The object of my present invention is to provide improved means for stabilizing the harrow and resisting the tendency of the rear section to slue under conditions of unequal load encountered by the disks at one side or the other of the median line of the harrow, which object I accomplish as illustrated in the drawings and hereinafter described. What I regard as new is set forth in the claims.

In the accompanying drawings,—

Fig. 1 is a plan view of a typical tandem disk harrow having my improvements applied thereto. In said figure the disks of the several gangs are shown in their transport or inoperative position, that is to say, they are parallel with the line of draft so that they do not operate to turn the soil. The usual scrapers are omitted from the illustration of the rear gangs to simplify the drawing, but it will be understood that the rear gangs are usually provided with scrapers similar to those of the front gangs;

Fig. 2 is a side elevation of the rear harrow section, showing the parts in the same position as in Fig. 1;

Fig. 3 is a plan view of the rear section and a part of the front frame, showing the gangs in their angled or operative position;

Fig. 4 is a side elevation of the parts arranged as shown in Fig. 3;

Fig. 5 is an enlarged view, being a partial vertical section on line 5—5 of Fig. 3, showing the stabilizing means and the connections by which its position is controlled;

Fig. 6 is an end view of the parts shown in Fig. 5; and

Fig. 7 is a plan view of the parts shown in Figs. 5 and 6, the mounting of the stabilizer disk being shown in section.

Referring to the drawings, and particularly to Fig. 1, 8 indicates the front frame as an entirety and 9 the rear frame. These two frames may be of any approved design, but I prefer the construction shown in the drawings. In the illustrated construction the front frame comprises a transverse member, in the form of a bar 10, to the end portions of which are connected forwardly converging bars 11, 12, which also have parallel portions 13, 14 that extend rearwardly from the bar 10 and are adjustably and pivotally connected with the outer portions of the usual front gangs 15, 16. The position of these pivotal connections is indicated at 17, 18, and they are of such character that the disk gangs may swing about vertical axes to change the angular position of the disks with reference to the line of draft. It will be noted that in the illustration the disks 19 of the gang 15 are set oppositely to the disks 20 of the gang 16, so that the disks of both gangs when angled by swinging the inner ends of the gangs rearwardly will throw the soil in an outward direction or away from the median line of the harrow.

The front frame also comprises parallel bars 21, 22 set a short distance apart at opposite sides of the median line of the harrow. These bars are connected at their rear ends with the transverse bar 10, and at their forward ends with the converging bars 11, 12, and serve to support the devices by which the angular position of the gangs is adjusted. The adjusting means illustrated is of the type shown and described in Letters Patent No. 1,546,546, to H. B. McKahin, dated July 21, 1925, and comprises a member 23 in the form of a bar arranged to swing fore and aft about a transverse axis and connected by suitable intermediate devices with the forward ends of links 24, 25, the rear ends of which are connected by pivots 26, 27 with the inner ends of the front gangs 15, 16, the arrangement being such that by moving said links fore and aft the angular position of the front gangs may be adjusted and held in their different positions of adjustment. The upper end of the member 23 is moved fore and aft by means of a screw 28, the forward end portion of which is journaled in a block 29 suitably supported by the frame bars 24, 25 while its rear end is threaded in a block 30 pivotally connected with the upper end of the member 23, which is preferably forked, as shown in Fig. 1. The front end of the screw 28 is provided with a hand wheel 31 by which it may be rotated to move the block 30 forward or backward, thereby correspondingly swinging the member 23 and adjusting the angular position of the front gangs. It is believed to be unnecessary to describe these parts more in detail as the construction is fully shown and described in said McKahin patent. Moreover, my present invention is not limited to the particular means employed for angularly adjusting the disk gangs, as any suitable arrangement for the purpose may be employed. The parts 32, 33 shown in Fig. 1 are the usual scraper supporting bars.

The rear frame 9 comprises a transverse bar 34 provided at its ends with rearward extensions 35, 36 to which, at the points 37, 38, are pivoted the rear gangs 39, 40 comprising disks 41, 42 set oppositely to those of the corresponding front gangs. As will hereinafter appear, the rear gangs may be angularly adjusted with reference to the line of draft, and are arranged to be angled oppositely to the corresponding front gangs. Extending forward from the transverse bar 34 are converging bars 43, 44, the forward end portions of which are parallel with each other and are spaced a short distance apart, as shown at 45, 46. The parts 45, 46 are held in fixed relation to each other by suitable spacing blocks 47, 48, as best shown in Figs. 3 and 4, the block 47 carrying a vertical pivot 49 by which the rear frame is pivotally connected with the front frame so that it may swing laterally relatively thereto. Preferably the pivot 49 is connected with a rearwardly extending plate 50 carried by the transverse bar 10.

The rear gangs are angled by means of a shaft 51 that is located in the median line of the harrow and extends through the screw 28, which is tubular. The front end of the shaft 51 projects forward beyond the hand wheel 31 and is provided with a crank 52 or other suitable means for rotating it, while its rear end is provided with a universal coupling 53 which connects it with the forward end of a screw 54 journaled in suitable bearings provided at the upper ends of the blocks 47, 48. Threaded upon said screw is a block 55, the end portions of which are pivotally connected with the forward ends of links 56, 57, the rear ends of said links being connected with the inner end portions of the gangs 39, 40, as shown at 58, 59 in Fig. 3. Obviously, by rotating the shaft 51 the screw 54, which is held against endwise movement in its bearings by a collar 60, may be rotated in either direction to move the block 55 backwards or forwards, thereby, through the links 56, 57, moving the inner ends of the rear gangs rearward or forward, and holding them in their different positions of adjustment. This may be done regardless of the angular position of the rear section with reference to the front section, and conjointly with or independently of the adjustment of the front gangs.

The construction as thus far described is not new, as in general it is similar to that shown in the McKahin patent hereinbefore mentioned, but it has been briefly described as knowledge of the operation of the adjusting devices for the rear gangs is necessary to a clear understanding of my improvements.

In tandem disk harrows, as has been indicated, the disks of the rear gangs are set to throw the dirt in the opposite direction to that in which it is thrown by the front gangs, usually the front disks throwing it outwardly and the rear disks throwing it inwardly, although this is not essential; but in all cases the rear disks should cut the ridges left by the disks of the front gangs instead of traveling in the furrows made by such disks. It will be apparent therefore that, in the absence of means for resisting lateral swinging of the rear section, any unbalancing of the load on the rear gangs would tend to cause their disks to slip sidewise into such furrows, and as they naturally would follow the line of least resistance they would tend to remain therein. To avoid this as far as practicable, I provide stabilizing means associated with the rear section, arranged to engage the ground in such manner as to resist lateral swinging of the rear frame with reference to the front frame. In the embodiment of my invention illustrated, such stabilizing means is in the form of a flat disk 61, similar to a colter, which is mounted in the median line of the harrow, and when the harrow is in operation is adapted to penetrate the soil to greater or less depth depending on the depth of cultivation, but when the harrow disks are in their inoperative position is arranged to be lifted out of contact with the ground. As best shown in Figs. 5, 6 and 7, the disk 61 is mounted on one end portion of a shaft 62 which is preferably S-shaped, being provided with two parallel end portions 63, 64 that extend transversely of the harrow. The disk 61 is journaled on the end portion 63 and is clamped in position between two sleeves 65, 66, pivotally mounted on said end portion at opposite sides of the disk, over a collar 67 that is non-rotatably secured to said shaft by a pin 68. Thus the disk is securely held on the shaft, but is free to rotate. A suitable lubricant may be introduced into the disk bearing around the collar 67, which is protected from dust by the sleeves 65, 66.

The end portion 64 of the shaft 62 is journaled in a sleeve 69 carried at the lower end of a bracket 70 that is secured by bolts 71 to the transverse bar 34 of the rear frame adjacent to the center thereof, as best shown in Figs. 3 and 6. The sleeve 69 is provided with an opening 72 for the introduction of a collar 73, which is mounted upon the end portion 64 of the shaft 62 and is secured thereto by a set screw 74 so that it serves to hold the shaft in position in its bearing, but permits vertical swinging thereof.

The bracket 70 is provided with an upwardly extending arm 75, upon which, at the point 76, is fulcrumed a lever 77. The fulcrum point of said lever is adjacent to its rear end, thereby providing a rearwardly projecting short arm 78, and a comparatively long front arm 79, which is preferably curved, as shown in Fig. 5. The short arm 78 is connected by a pivot bolt 80 with the upper end portion of a link 81, the lower end of which is pivoted upon the end portion 63 of the shaft 62, preferably adjacent to the outer end of the sleeve 66, as shown in Figs. 6 and 7. By this construction it will be obvious that by swinging the lever 77 about its fulcrum the shaft 62 may be rocked in the sleeve 69, thereby moving the disk 61 vertically. To provide for adjusting the range of movement of said disk the link 81 is provided with a series of holes 82 so that it may be connected at different points with the arm 78.

The long arm 79 of the lever 77 is connected by a pivot bolt 83 with the rear end of a link 84, the forward end of which is connected by a bolt 85 with one of the links 56, 57, in the illustrated construction it being connected to the link 56. Preferably a series of holes 86 is provided in the link 84, or the arm 79, as preferred, for varying the range of movement of the lever 77.

By this construction, when the links 56, 57 are moved forward or backward to adjust the angular position of the rear gangs, the lever 77 will be swung up and down about its fulcrum 76, thereby vertically adjusting the disk 61, rearward movement of said links causing the short arm 78 of said lever to swing upward, thereby lifting the stabilizer disk 61, while forward movement of said links lowers said disks. Consequently, as rearward movement of said links straightens the disks and decreases the depth of cultivation, the stabilizer disk will then penetrate the earth less deeply, whereas when the disks are set at a greater angle the depth of penetration of the stabilizer disk is increased.

The parts are so adjusted that within the ordinary range of adjustment of the disks for operating purposes the stabilizing disk will move slowly, but when the disks almost reach an inoperative angle the stabilizer disk is lifted rapidly to a point where it is free of the ground. This is accomplished by arranging the lever 77 so that its short arm 78 moves more rapidly as the disks near their straight position.

I have thus provided a stabilizer which is laterally rigid with reference to the rear frame and by its engagement with the ground resists the tendency of the rear section to swing laterally, and, therefore, holds the rear disks in their proper operating position. Moreover, when the disks are set for deeper cultivation, at which time an unbalanced condition would exert greater side thrust, the stabilizer penetrates the ground more deeply and is, therefore, more effective to resist such increased side thrust. When the disks are in transport position the stabilizer is lifted clear of the ground so that it will be protected from damage.

So far as I am aware, I am the first in the art to provide a stabilizer of the character described, and the claims hereinafter made are, therefore, to be construed accordingly.

What I claim as my invention and desire to secure by Letters Patent, is:—

1. A tandem disk harrow comprising front and rear frames connected for relative lateral swinging, angularly adjustable gangs of disks connected with said frames respectively, and stabilizing means connected with the rear frame and engaging the ground to resist lateral swinging of the latter frame.

2. A tandem disk harrow comprising front and rear frames connected for relative lateral swinging, angularly adjustable gangs of disks connected with said frames respectively, and vertically adjustable stabilizing means connected with the rear rear frame and engaging the ground to resist lateral swinging of the latter frame.

3. A tandem disk harrow comprising front and rear frames connected for relative lateral swinging, angularly adjustable gangs of disks connected with said frames respectively, and stabilizing means connected with the rear frame and arranged to penetrate the ground to resist lateral swinging of the latter frame.

4. A tandem disk harrow comprising front and rear frames connected for relative lateral swinging, angularly adjustable gangs of disks connected with said frames respectively, stabilizing means connected with the rear frame and arranged to penetrate the ground to resist lateral swinging of the latter frame, and means operable to vary the depth of penetration of said stabilizing means.

5. A tandem disk harrow comprising front and rear frames connected for relative lateral swinging, angularly adjustable gangs of disks connected with said frames respectively, stabilizing means connected with the rear frame and engaging the ground to resist lateral swinging of the latter frame, and means operable to angularly adjust the rear gangs and to simultaneously vertically adjust said stabilizing means.

6. A tandem disk harrow comprising front and rear frames connected for relative lateral swinging, angularly adjustable gangs of disks connected with said frames respectively, stabilizing means connected with the rear frame and arranged to penetrate the soil to resist lateral swinging of the latter frame, and means operable to angularly adjust the rear gangs and simultaneously vertically adjust said stabilizing means to vary its depth of penetration to correspond with variation in the depth of cultivation.

7. A tandem disk harrow comprising front and rear frames connected for relative lateral swinging, angularly adjustable gangs of disks connected with said frames respectively, stabilizing means connected with the rear frame and engaging the ground to resist lateral swinging of the latter frame, and means operable to move said stabilizing means out of engagement with the ground.

8. A tandem disk harrow comprising front and rear frames connected for relative lateral swinging, angularly adjustable gangs of disks connected with said frames respectively, stabilizing means connected with the rear frame and engaging the ground to resist lateral swinging of the latter frame, and means operable to angularly adjust the rear gangs and to simultaneously lift the stabilizing means out of engagement with the ground.

9. A tandem disk harrow comprising front and rear frames connected for relative lateral swinging, angularly adjustable gangs of disks connected with said frames respectively, and stabilizing means connected with the rear frame and engaging the ground to resist lateral swinging of the latter frame, said stabilizing means being in the form of a member fixedly held in the line of draft.

10. A tandem disk harrow comprising front and rear frames connected for relative lateral swinging, angularly adjustable gangs of disks connected with said frames respectively, and stabilizing means connected with the rear frame and engaging the ground to resist lateral swinging of the latter frame, said stabilizing means being in the form of a disk fixedly held in the line of draft.

11. A tandem disk harrow comprising front and rear frames connected for relative lateral swinging, angularly adjustable gangs of disks connected with said frames respectively, stabilizing means connected with the rear frame and arranged to penetrate the ground to resist lateral swinging of the latter frame, said stabilizing means being in the form of a member fixedly held in the line of draft, and means operable to vary the depth of penetration of said member.

12. A tandem disk harrow comprising front and rear frames connected for relative lateral swinging, angularly adjustable gangs of disks connected with said frames respectively, stabilizing means connected with the rear frame and arranged to penetrate the ground to resist lateral swinging of the latter frame, said stabilizing means being in the form of a member fixedly held in the line of draft, and means operable to angularly adjust the rear gangs to vary the depth of cultivation and to simultaneously vertically adjust said stabilizing member to increase the depth of its penetration when the gangs are adjusted for deeper cultivation.

13. A tandem disk harrow comprising front and rear frames connected for relative lateral swinging, angularly adjustable gangs of disks connected with said frame respectively, stabilizing means connected with the rear frame and arranged to penetrate the ground to resist lateral swinging of the latter frame, said stabilizing means being in the form of a member fixedly held in the line of draft, and means operable to angularly adjust the rear gangs to vary the depth of cultivation and to simultaneously vertically adjust said stabilizing member to increase the depth of its penetration when the gangs are adjusted for deeper cultivation, and to move said stabilizing member out of engagement with the ground when the gangs are turned to inoperative position.

14. A tandem disk harrow comprising front and rear frames connected for relative lateral swinging, angularly adjustable gangs of disks connected with said frames respectively, a shaft connected with the rear frame to swing vertically about a transverse axis, a ground engaging stabilizing disk mounted on said shaft to rotate about a transverse axis and to be moved vertically by the swinging of said shaft, a lever connected with said disk and operable to move the same vertically, and means operable to actuate said lever.

15. A tandem disk harrow comprising front and rear frames connected for relative lateral swinging, angularly adjustable gangs of disks connected with said frames respectively, a shaft connected with the rear frame to swing vertically about a transverse axis, a ground engaging stabilizing disk mounted on said shaft to rotate about a transverse axis and to be moved vertically by the swinging of said shaft, a lever connected with said disk and operable to move the same vertically, and means operable to angularly adjust the rear gangs, said lever being connected with said gang adjusting means whereby said stabilizing disk is adjusted vertically coincidently with the angular adjustment of the latter gangs.

16. A tandem disk harrow comprising front and rear frames connected for relative lateral swinging, angularly adjustable gangs of disks connected with said frames respectively, a shaft connected with the rear frame to swing vertically about a transverse axis, a ground engaging stabilizing disk mounted on said shaft to rotate about a transverse axis and to be moved vertically by the swinging of said shaft, a lever fulcrumed on the rear frame and having a rearwardly extending short arm connected with said disk, and a forwardly extending long arm, and means operable to angularly adjust the rear gangs, the long arm of said lever being connected with said gang adjusting means, whereby said lever is actuated to vertically adjust said stabilizing disk when the rear gangs are angularly adjusted.

WILLIAM L. PAUL.